Nov. 16, 1954
F. J. TUPA
2,694,467
APPARATUS FOR LOWERING SACKED POTATOES
DISCHARGED FROM POTATO GRADERS
Filed Sept. 4, 1953
2 Sheets-Sheet 1
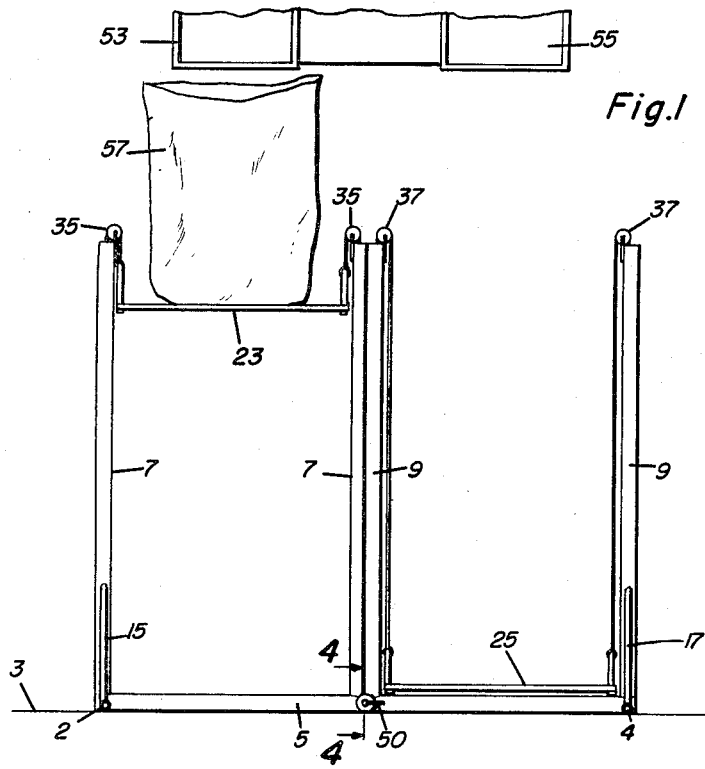
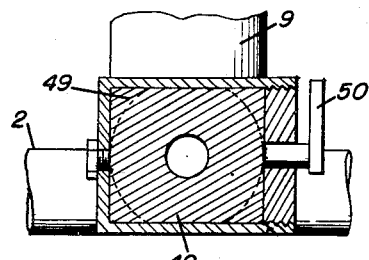
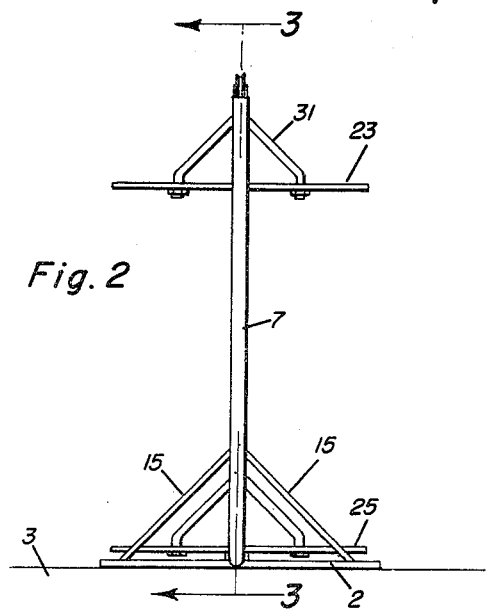
Frank J. Tupa
INVENTOR.

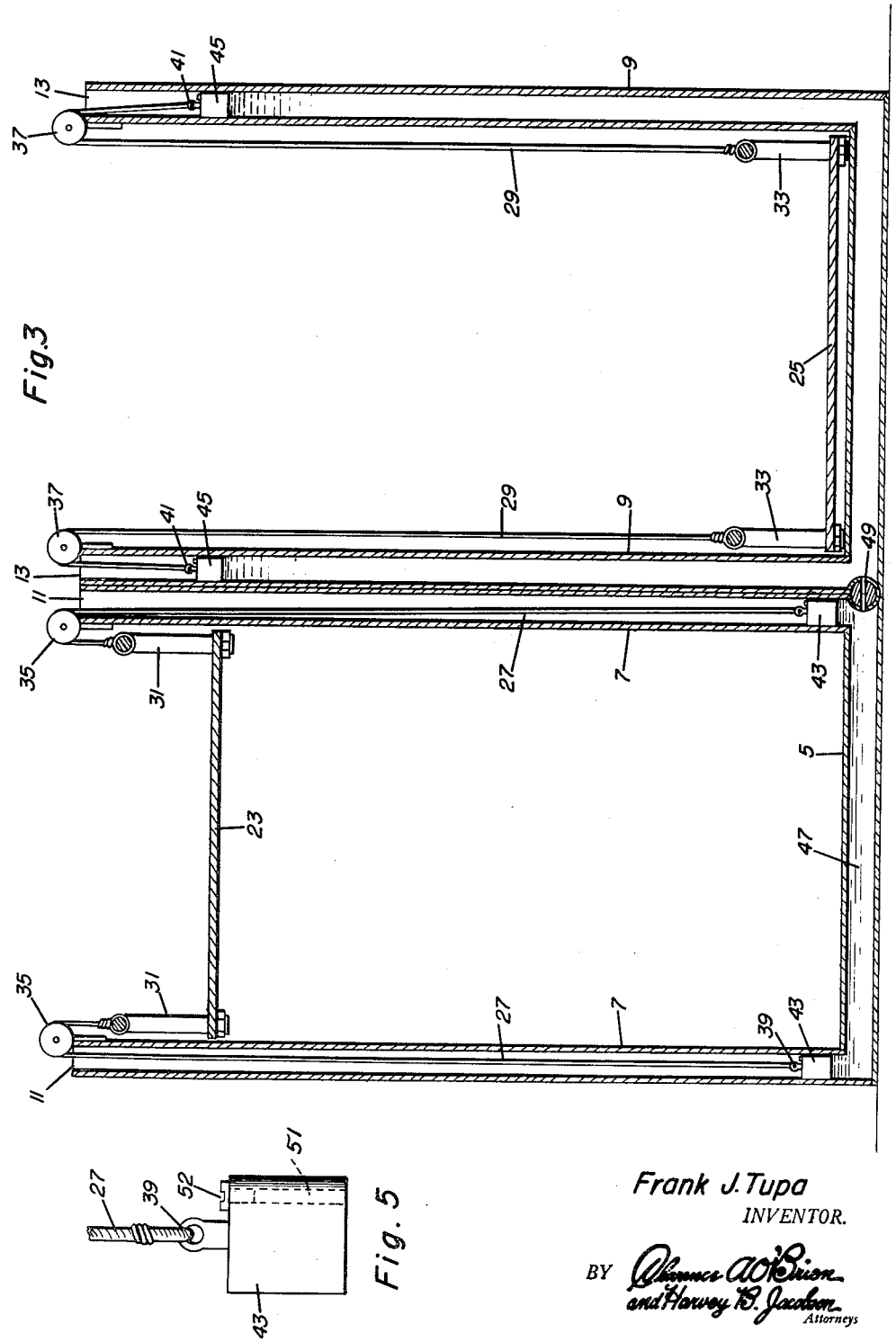

United States Patent Office 2,694,467
Patented Nov. 16, 1954

2,694,467

APPARATUS FOR LOWERING SACKED POTATOES DISCHARGED FROM POTATO GRADERS

Frank J. Tupa, Minto, N. Dak.

Application September 4, 1953, Serial No. 378,471

4 Claims. (Cl. 187—17)

My invention relates to improvements in apparatus for lowering sacked potatoes as the potatoes are discharged from a potato grader into the sacks.

The primary object of my invention is to provide apparatus for lowering sacks of potatoes from a position close to the grader discharge into a position close to a floor, or the like, gradually as the sacks are filled from the grader, and so that the potatoes will fall from the grader into the sacks without becoming bruised or otherwise damaged.

Another object is to provide apparatus for the above purpose embodying means for controlling lowering of the sacked potatoes so that the same will not be lowered with increased speed under increasing weight of the load in the sacks.

Still another object is to provide mobile apparatus for the above purposes which is of very simple construction, light in weight for easy moving about, and inexpensive to manufacture and service.

Other and subordinate objects, together with the precise nature of my improvements will become readily apparent when the succeeding description and claims are read with reference to the drawings accompanying and forming part of this specification.

In said drawings:

Figure 1 is a view in front elevation of my improved apparatus positioned relative to a potato grader;

Figure 2 is a view in side elevation of the apparatus;

Figure 3 is an enlarged view in vertical section taken on the line 3—3 of Figure 2;

Figure 4 is an enlarged view in transverse section taken on the line 4—4 of Figure 1, and Figure 5 is an enlarged view in side elevation of one of the plungers.

Referring to the drawings by numbers, my improved apparatus comprises a pipe member 5 adapted to rest horizontally on a floor 3 or the like, the ends of said member being closed, and said member having pairs of diametrically opposite radial pipe sections 2, 4 at its ends engaging the floor 3 to stabilize said member 5.

Like pairs of laterally spaced pipe members 7, 9 of the same length rise from and are suitably fixed to the pipe member 5 coplanar therewith and which open at the lower ends thereof into said member 5 and are open at their upper ends 11, 13, the arrangement being such that pipe members 7, 9 in each pair are contiguous and engage peripherally in the transverse center of the pipe member 5 and the other pipe members 7, 9 of the pairs rise from the ends of the pipe member 5. A pair of diagonal brace rods 15 extend from one of the pair of pipe members 7 to the end of pipe sections 2, and a pair of brace rods 17 similarly extend from one of the pair of pipe members 9 to the end of pipe sections 4.

A pair of platforms 23, 25 are associated with the pairs of pipe sections 7, 9 respectively for supporting single sacks of potatoes. Each platform 23, 25 is suspended at opposite sides thereof between its associated pair of pipe members 7, 9 for raising and lowering by means of a pair of cables 27, 29 for said platforms 23, 25 respectively. The suspending cables 27, 29 for the platforms 23, 25 are attached at one end to side hangar brackets 31, 33 on the platforms 23, 25 respectively, trained upwardly over pairs of pulleys 35, 37 on the upper ends of the pair of pipe members 7, 9 with which said platforms are associated, and extended downwardly from said pulleys in said associated pairs of pipe members 7, 9 with the other ends of the pairs attached, as at 39, 41 to and suspending pairs of plungers 43, 45 vertically slidably in the pairs of pipe members 7, 9 associated with said platforms 23, 25.

The pairs of suspending cables 27, 29 for the platforms 23, 25, and the plungers 43, 45 on said pairs of cables are so arranged that when either platform 23, 25 is fully raised, for instance platform 23 as shown in Figure 3, the plungers 45 on the suspending cables 41 are at the lower ends of the pipe members 7 associated with said platform, whereas, when either platform is fully lowered close to the pipe member 5, the plungers on its suspending cables are adjacent the upper ends of the pipe members associated with the platform.

The pipe member 5 and the pairs of pipe members 7, 9 below the plungers 43, 45 are filled with nonelastic liquid medium such as oil 47 so that when each platform is being lowered under weight thereon, the plungers on the supporting cables therefore will by raising in the associated pair of pipe members create a constant suction in the other pair of pipe members to draw the plungers in said other pair of pipe members downwardly and raise the other platform, it being understood, of course, that the platforms 23, 25 are not heavy enough, when unloaded, to overcome the suction below the plungers.

A suitable control valve 49 in the pipe member 5 between the pairs of pipe members 7, 9 and having an operating handle 50 provides for retarding transfer of the oil from one pair of pipe sections 7, 9 into the other, to thereby vary the rate of speed at which the platforms 23, 25 will be lowered under weight thereon.

The oil 47 is introduced into the pairs of pipe members 7, 9 and into the pipe members 5 by removing the plungers from one pair of pipe members 7 or 9 when said plungers are in the raised position and so that oil may be introduced into the pipe members through the upper ends of the pairs of pipe members 7, 9. To facilitate the removing of the plungers 43, 45 from the pairs of pipe members 7, 9 each plunger, for instance one of the plungers 43, is provided with a vertical port 51 for relieving the vacuum below the plunger and which is closed by a top screw 52 removable at will to open the port.

The operation of my invention will be readily understood. Either platform, for instance 23, is fully raised, in a manner presently clear, the valve 49 is closed and said platform will remain fully raised inasmuch as when it is unloaded its weight is not sufficient to overcome the vacuum below the plungers 43 on suspension cables 27. The other platform 25 is, of course, lowered by raising of the platform 23 in the manner previously explained.

The apparatus is now positioned below, preferably, a pair of laterally spaced discharge chutes 53, 55 of a potato grader with the platforms under said chutes. The valve 49 is closed to prevent the oil from finding a common level in the pairs of pipe sections 7, 9 and thereby permitting the platforms 23, 25 to assume an intermediate position. A sack 57 on the platform 23 is now held so that potatoes from the chute 53 may discharge thereinto. The valve 49 is now opened and the platform 23 will now lower under the weight of the load and raise the other platform 25 in the manner already described. As the weight in the sack increases, that is to say, on the platform 23, the speed of lowering movement of the platform 23 is controlled by closing the valve 49 to progressively restrict transfer of oil from the pair of pipe members 9 to the pair 7. When the platform 23 is fully lowered, the filled sack is removed, the valve 49 closed again so that the other platform 25 will be maintained fully raised and a sack on the platform 25 is filled from the chute 55 and valve 49 again opened for lowering of said platform 25 and raising of the platform 23. These operations are repeated as often as may be found necessary to lower the required number of sacks of potatoes.

Of course, the apparatus may be positioned to alternately locate the platforms 23, 25 under one discharge chute for lowering potatoes discharged into sacks from a single chute.

The foregoing will, it is believed, suffice to impart a clear understanding of my invention, without further explanation.

Manifestly, the invention as described, is susceptible of modification, without departing from the inventive concept, and right is herein reserved to such modifications as fall within the scope of the invention as herein disclosed.

What I claim is:

1. Apparatus for lowering material comprising a horizontal pipe member closed at its ends, two coplanar pairs of laterally spaced pipe members rising from and fixed to said horizontal pipe member and opening at their lower ends thereinto so that the pipes of said pairs communicate with each other through said horizontal pipe member, a pair of platforms associated with the pairs of pipe members respectively, pairs of cables attached to the platforms respectively and suspending the platforms between the associated pairs of pipe members for raising and lowering movement, the pairs of cables suspending each platform extending downwardly into the pair of associated pipe members and having plungers suspended therefrom in the associated pair of pipe members and slidably fitted thereon for raising in said associated pair of pipe sections by lowering of the associated platform to create suction in the other pair of pipe members for lowering the plungers in said other pair to raise the associated platform, said pipe members being filled with non-elastic liquid below said plungers for maintaining a constant suction in each pair of pipe sections.

2. The combination of claim 1 and valve means in said horizontal member for retarding transfer of the liquid from each to the other pair of pipe members to vary the suction created in said pairs.

3. The combination of claim 1, said pairs of cables being connected to opposite sides of the platforms respectively.

4. The combination of claim 1, said plungers having ports therein for relieving the vacuum below said plungers so that said plungers may be removed out of the upper ends of the pairs of pipe members for introducing the liquid into said pipe members, and removable plugs in said ports for closing and opening the same.

No references cited.